March 27, 1951  J. F. GRABILL  2,546,438
AUTOMOBILE WINDOW SUNSHADE
Filed Feb. 2, 1949
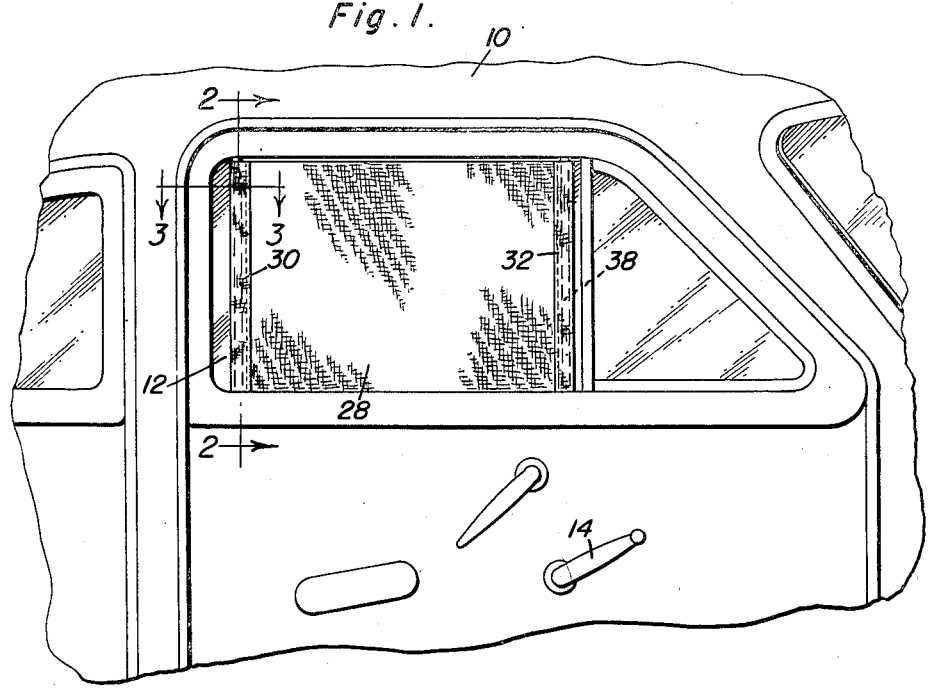
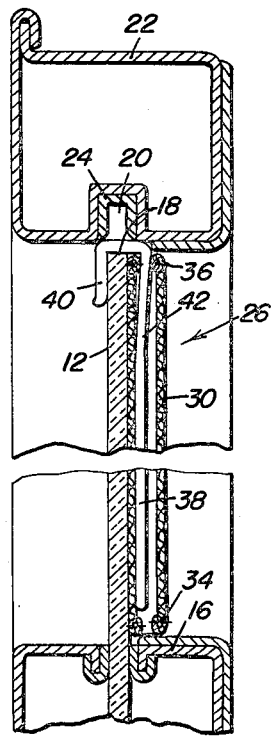
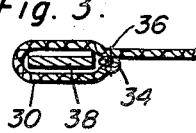
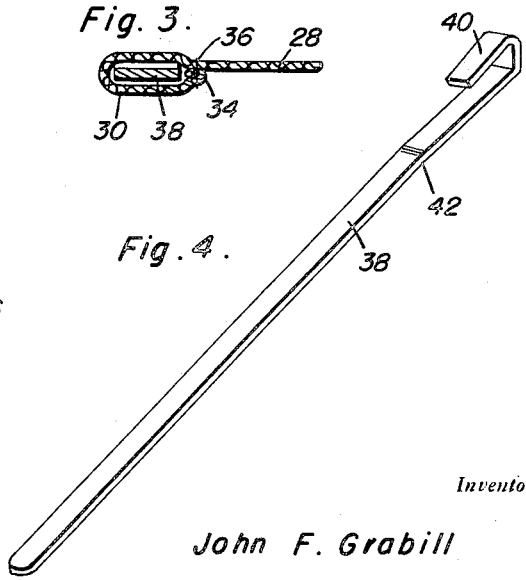
Inventor
John F. Grabill
By Clarence A. O'Brien
and Harvey B. Jacobson
Attorneys Patented Mar. 27, 1951

2,546,438

UNITED STATES PATENT OFFICE 2,546,438

AUTOMOBILE WINDOW SUNSHADE

John F. Grabill, Flora, Ill.

Application February 2, 1949, Serial No. 74,113

1 Claim. (Cl. 160—327)

This invention relates to a novel sunshade and has for its primary object to permit the ready suspension and removal of the shade on any side window of an automotive vehicle.

A further object of this invention is to provide a novel sunshade for automotive vehicles which can be readily folded up and put away when not in use.

A still further object of this invention is to provide a sunshade of the character described in which the shade consists of a substantially rectangular sheet of colored textile material which is foldable so that after the shade is suspended on a side window of the automotive vehicle, it can be readily adjusted thereon or pushed to one side or the other of the window in the manner of drawing a curtain across the window.

And another important object of this invention is to provide a sunshade of the character described which is extremely simple in construction and design, economical to manufacture, and simple to suspend or remove from any retractable window in an automotive vehicle.

These, together with various ancillary objects and features of the invention which will later become apparent as the following description proceeds, are attained by the device, a preferred embodiment of which has been illustrated by way of example only in the accompanying drawings, wherein:

Figure 1 is a side elevational view of the device shown suspended on a side window of an automotive vehicle;

Figure 2 is a sectional view taken substantially on the plane of section line 2—2 of Figure 1;

Figure 3 is a sectional view taken substantially on the plane of section line 3—3 of Figure 1; and Figure 4 is a perspective view of a bar or bracket employed to suspend the shade on the window.

Specific reference is now made to the drawings. In the several views in the accompanying drawings and in the following specification reference characters indicate corresponding elements throughout.

Indicated generally at 10 is any automotive vehicle, Figure 1 showing the interior thereof, having a side window 12 positioned in a side wall of the body of the vehicle and retractable by means of a conventional handle 14 within the channels 16. The top edge 18 of the window is receivable in a recess 20 formed in a bracket 22 carried in the top portion of the wall of the body, the recess 20 being provided with the usual rubber or felt grommet 24.

All of the elements hereinabove described are, of course, conventional and the novel sunshade of the instant invention is generally indicated at 26 and consists of a substantially rectangular, foldable textile material or cloth 28 preferably of such dimensions as to cover the entire side window 12 when extended. It will be understood that the cloth will be colored with any suitable color to render the latter substantially opaque and exclude the direct glare of sun light. The vertical edges of the cloth are folded to produce vertically extending sleeves 30 and 32, the free edges of the cloth 28 being preferably inturned as at 34 and secured to the cloth by sewing as at 36 or any other suitable means.

Slidably and removably retained in each of the sleeves 30 and 32 is an elongated bar or plate 38 which is provided at its upper end with a hook member 40 in the form preferably of a substantially L-shaped downstruck lug.

In practical operation, the hook members 40 are slid upon the top edge 18 of the side window 12 and the window is raised so that the hook members 40 abut the inner lower surface of the upper bracket 22 in the side wall of the body as shown in Figure 2. It will be noted that the bars 38 are turned outwardly slightly as at 42 so that the bottom portion of the bar will urge the shade 28 against the inner surface of the window 12 to frictionally retain the latter against the window. If it is desired to compress the shade, the window may be retracted a short distance and the shade pushed to one side or the other of the window in a manner akin to the drawing of a curtain across a window. It will also be seen that the entire shade can be readily and easily suspended upon or removed from the window. When not in use, the shade may be rolled up together with the bars 38 or ultimately, the bars may be removed from the sleeves 30 and the shade can be folded up to occupy as little space as possible to be placed in the glove compartment of the automotive vehicle.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

In an automotive vehicle having a side window, a sunshade comprising a substantially rectangular sheet of textile material, vertically extending sleeves adjacent the vertical edges of said sheet, and bars received in said sleeves having hook members at their upper ends for removably engaging the top edge of the side window, said hook members being inclined outwardly from said bars whereby the bars urge the sheet into frictional engagement with the window.

JOHN F. GRABILL.

REFERENCES CITED

The following references are of record in the file of this patent:

UNITED STATES PATENTS

| Number | Name | Date |
|---|---|---|
| 1,325,227 | Blankennagel | Dec. 16, 1919 |
| 2,059,924 | Woina | Nov. 13, 1936 |

FOREIGN PATENTS

| Number | Country | Date |
|---|---|---|
| 12,510 | Great Britain | 1907 |